No. 883,724.  PATENTED APR. 7, 1908.
I. KITSEE.
ELECTRIC TRANSMISSION OF INTELLIGENCE.
APPLICATION FILED JULY 18, 1907.
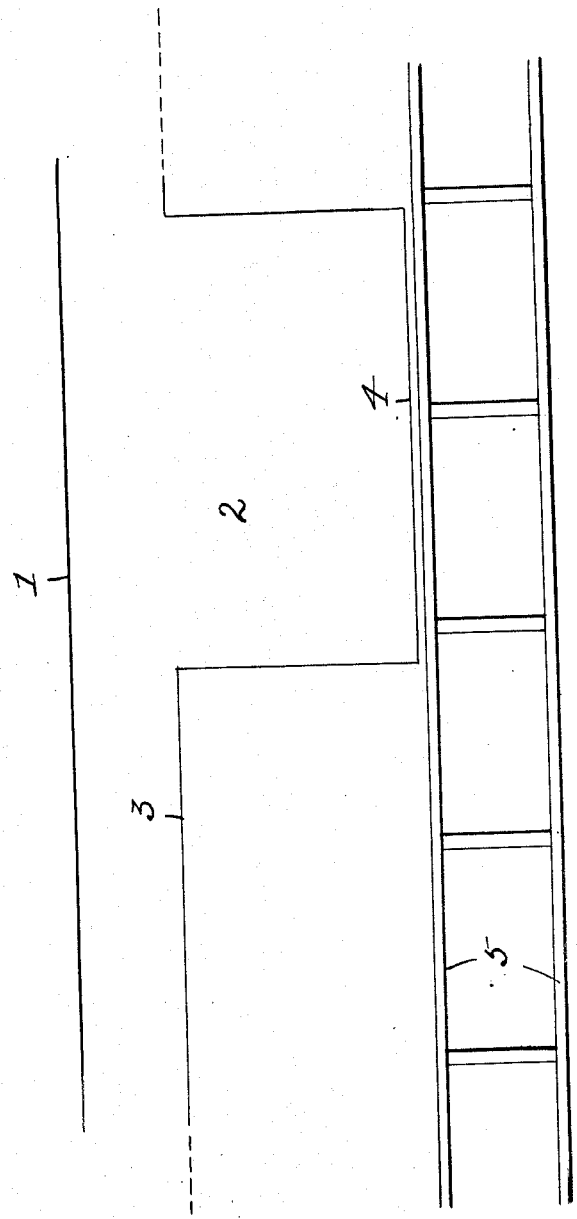
WITNESSES:  INVENTOR.

UNITED STATES PATENT OFFICE.

ISIDOR KITSEE, OF PHILADELPHIA, PENNSYLVANIA.

ELECTRIC TRANSMISSION OF INTELLIGENCE.

No. 883,724.     Specification of Letters Patent.     Patented April 7, 1908.

Application filed July 18, 1907. Serial No. 384,300.

*To all whom it may concern:*

Be it known that I, ISIDOR KITSEE, a citizen of the United States, residing at Philadelphia, in the county of Philadelphia and State of Pennsylvania, have invented certain new and useful Improvements in Electric Transmission of Intelligence, of which the following is a specification.

My invention relates to an improvement in the electric transmission of intelligence. Its object is to neutralize the impulses induced in lines of transmission from neighboring wires.

The drawing represents in diagrammatic view a line of transmission, an inducing line and means to neutralize the impulses induced in said transmitting line.

I have illustrated this, my invention, as being applied to a line of transmission in the inducing region of a power wire used for electric propulsion and I have, therefore, illustrated the return as to consist of the rails of travel.

In my experiments, which were carried on for a number of years, I have made careful tests and found that an arrangement—wherein part of the line is carried in the inducing field of the power wire and part of the line is carried in the inducing field of the return—will effectually neutralize the induced impulses. In this drawing, 1 is the power wire; 5 are rails of travel; and 2 the line of transmission (useful for telegraph or telephone) as an entirety. Of this line, 3 is the part placed in the inducing region of the power wire 1, and 4 the part placed in the region of the return or rail 5. When, through the flow of an alternating or phase current, an impulse is induced in the part 3 of the line 2, an impulse flowing in the opposite direction is simultaneously induced in the part 4 of said line.

In practice, the length as well as the distance from the inducing field should be so balanced that the amount of induction from 1 into 3 should be equal to the amount of induction from 5 into 4. In practice the lines of transmission are usually carried further than the power wire and I have, therefore, only illustrated such parts as are in the inducing region of the power wire.

Having now described my invention, what I claim as new and desire to secure by Letters Patent is:—

1. A line of transmission positioned in part in the inducing region of a power wire and in part in the inducing region of the rails of travel, said rails of travel forming part of the return of said power wire.

2. A line of transmission positioned in part in the inducing region of a power wire and in part in the inducing region of the return of said power wire.

3. In a system of electric transmission wherein a power wire is carried over-head and the rails of travel are utilized as the return, a line useful for the electric transmission of intelligence, one part of said line in the inducing region of the power wire and one part of said line in the inducing region of the rails.

In testimony whereof I affix my signature in presence of two witnesses.

ISIDOR KITSEE.

Witnesses:
   EDITH R. STILLEY,
   MARY C. SMITH.